United States Patent
Maiyuran et al.

(10) Patent No.: US 7,124,277 B2
(45) Date of Patent: Oct. 17, 2006

(54) METHOD AND APPARATUS FOR A TRACE CACHE TRACE-END PREDICTOR

(75) Inventors: Subramaniam Maiyuran, Gold River, CA (US); Peter J. Smith, Folsom, CA (US); Niranjan L. Cooray, Folsom, CA (US); Asim Nisar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 417 days.

(21) Appl. No.: 10/646,033

(22) Filed: Aug. 22, 2003

(65) Prior Publication Data

US 2005/0044318 A1   Feb. 24, 2005

(51) Int. Cl.
G06F 9/26 (2006.01)
G06F 9/34 (2006.01)
G06F 12/00 (2006.01)
G06F 12/02 (2006.01)
G06F 12/04 (2006.01)
G06F 12/08 (2006.01)
G06F 12/10 (2006.01)

(52) U.S. Cl. ...................... 711/213; 711/221

(58) Field of Classification Search ........... 711/213, 711/221
See application file for complete search history.

(56) References Cited

U.S. PATENT DOCUMENTS 6,018,786 A * 1/2000 Krick et al. .................. 711/4
6,216,206 B1 * 4/2001 Peled et al. ............... 711/133

* cited by examiner

Primary Examiner—Reba I. Elmore
(74) Attorney, Agent, or Firm—Blakely, Sokoloff, Taylor & Zafman LLP

(57) ABSTRACT

A method and apparatus for a trace end predictor for a trace cache is disclosed. In one embodiment, the trace end predictor may have one or more buffers to contain a head address for a subsequent trace. The head address may include the way number and set number of the next head, along with partial stew data to support additional execution predictors. The buffers may also include tag data of the current trace's tail address, and may additionally include control bits for determining whether to replace the buffer's contents with information from another trace's tail. Reading the next head address from the trace end predictor, as opposed to reading it from the trace cache array, may reduce certain execution time delays.

27 Claims, 8 Drawing Sheets

US 7,124,277 B2

METHOD AND APPARATUS FOR A TRACE CACHE TRACE-END PREDICTOR

FIELD

The present disclosure relates generally to microprocessor systems, and more specifically to microprocessor systems capable of executing sequences of micro-operations from a trace cache.

BACKGROUND

In order to enhance the processing throughput of microprocessors, processors may hold instructions in a series of caches. One recent form of a cache is the trace cache. Rather than storing macro-instructions as is done in other caches, the trace cache contains sequences of previously-decoded micro-operations (micro-ops) of macro-instructions. The sequence of micro-ops may be stored in a sequence of set and way locations in the trace cache called a trace, where the micro-ops at a given set and way location may be called a traceline or trace element. Then, in further cases of executing the particular macro-instruction, decoding is not necessary and the sequence of micro-ops may be accessed from the corresponding trace in the trace cache.

One example of a trace cache is disclosed by Krick, et al., in U.S. Pat. No. 6,018,786. This patent discloses how traces in a trace cache may be constructed so that each element of a trace contains pointer data to find the next address within the trace, and how each tail of a trace may contain pointer data to find the address of the head of the next trace to be executed. However, there is still room for improvement in such a trace cache implementation. When determining the address of the head of the next trace, the pointer data in the current tail must be read from the trace cache array. This may cause a time delay called a head lookup penalty. The head lookup penalty may, among other things, require several stall cycles to be placed into the pipeline. These stall cycles represent a waste of resources that could instead be performing execution of micro-ops.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for accessing traces of micro operations (micro-ops) in a trace cache environment. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a processor, such as the Pentium 4® class machine made by Intel® Corporation, that may use trace caches. However, the invention may be practiced in other forms of processors that use trace caches.

Figure 1:
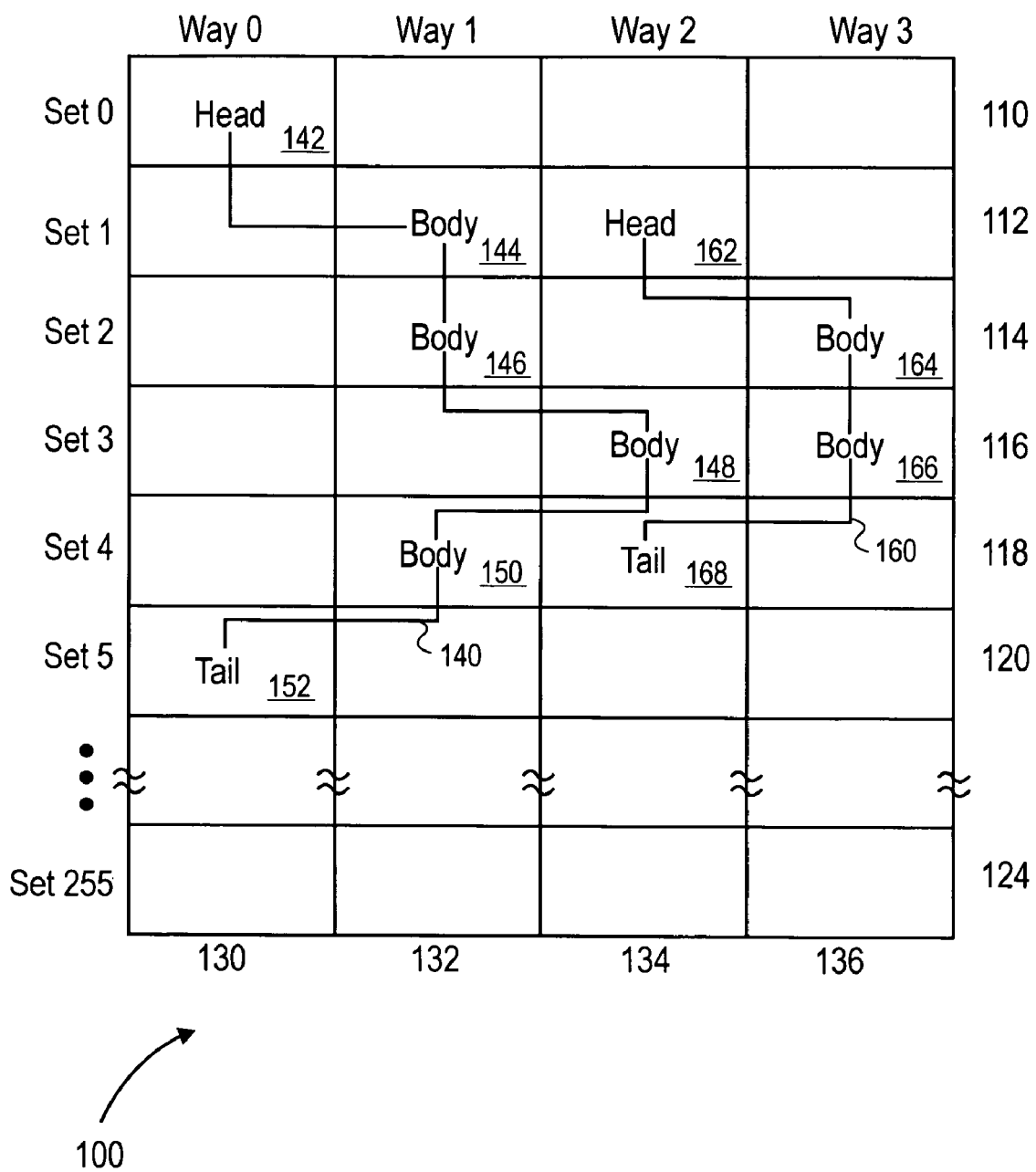
FIG. 1 is a schematic diagram of traces in a trace cache, according to one embodiment.

Referring now to FIG. 1, a schematic diagram of traces in a trace cache is shown, according to one embodiment. FIG. 1 illustrates traces 140, 160 of one embodiment, in the context of an 4-way 256-set embodiment of trace cache array 100 storing instructions that are decoded micro-ops of macro-instructions. Each storage location in the array, called a data line, may be identifiable by a set number and way number. Based on the descriptions to follow, those skilled in the art will appreciate that other sizes of set-associate caches, as well as non-set-associate caches, may be employed in other embodiments. Moreover, the instructions may be instructions of any kind.

For ease of further discussion, the first trace element of a trace 140 may be referred to as a trace head, or head 142; the last trace element of a trace being referred to as a trace tail, or tail 152; and the intermediate trace elements being referred to as trace bodies, or bodies 144, 146, 148, 150. In the degenerate case of a two-element trace, the second trace element is a trace body as well as a trace tail, and in the degenerate case of a single element trace, the singular trace element is a trace head, a trace segment body, as well as a trace tail at the same time.

In the FIG. 1 embodiment, a location address may be maintained for each traceline (or trace element) storing the first trace element of a trace. The traceline (or trace element) storing the first trace element of a trace may be located by address matching an access address against the location addresses maintained. Furthermore, the address matching may be performed using a subset of the address bits, and a matching traceline may be validated as to whether the indeed contains the first trace element being sought. Additionally, storing of trace elements is further qualified with a criteria of ensuring the address matching subset of the location addresses maintained in association with the various ways of a traceline set, if any, is unique. In one embodiment, the location address for the traceline may be a set number and a way number. In another embodiment, other trace elements may also be associated with memory addresses. In yet another embodiment, address matching may be performed using all address bits.

Partial control information sequentially associating each traceline (or trace element) storing a trace body or tail with its predecessor traceline in a logical manner may be maintained. Similarly, partial control information sequentially associating each traceline storing a trace head or body with its successor traceline in a logical manner may also be maintained. The successive tracelines of a multi-line trace are located, relying in part on the partial sequential association control information maintained. More specifically, for each traceline storing a trace body or tail, a way index indexing into a way of the set of the predecessor traceline may be maintained, and for each traceline storing a trace head or body, a way index indexing into a way of the set of the successor traceline may be maintained. Additionally, a predetermined set relationship between the successive data lines of a multi-line trace may be maintained.

A number of traceline (or trace element) terminating conditions may be employed to terminate caching of instructions of a trace in one data line, and to continue caching of the instructions of the trace in another data line. Furthermore, a number of trace terminating conditions may also be employed to terminate caching of instructions as one trace, and continue caching of instructions as a new trace.

The traceline (or trace element) terminating conditions may include the encountering of a branch micro-op after a predetermined threshold of maximum allowable branch micro-ops per trace has been reached. The branch micro-op may be cached in a new data line. In one embodiment, the predetermined threshold may be two. However, it will be appreciated, by those skilled in the art, that embodiments may be practiced with or without a predetermined thresholds for maximum allowable branch instructions or branch micro-ops per trace segment, and, if one is employed, the threshold may be less than or greater than two.

The traceline (or trace element) terminating conditions may further include the condition of not having enough room for all the micro-ops of a "new" macro-instruction. The micro-ops of the "new" macro-instruction may be cached in a new traceline instead. In other words, for the illustrated embodiment, all micro-ops of a macro-instruction may be cached in the same date line. However, it will be appreciated, by those skilled in the art, that the present invention may be practiced with micro-ops of a macro-instruction cached in more than one data line.

The trace segment terminating conditions may include the encountering of an indirect branch macro-instruction, a call, or a return. However, it will be appreciated, by those skilled in the art, that with additional tracking, the disclosed embodiments may be practiced with each trace segment having more than one indirect branch macro-instruction, a call, or a return. The trace segment terminating conditions may also include the encountering of a branch misprediction notification, as well as an interrupt or exception.

Figure 2:
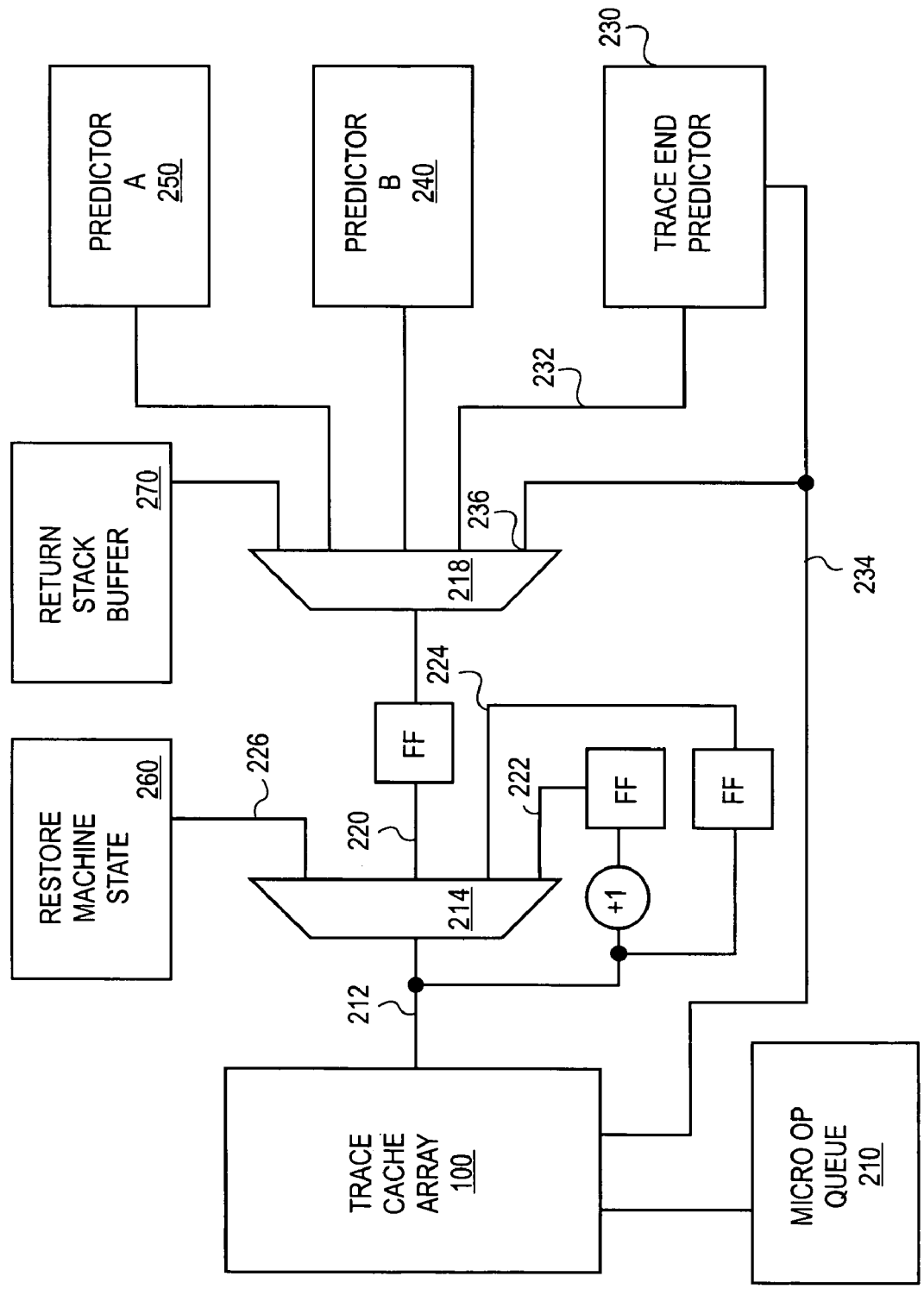
FIG. 2 is a chart of connections for a trace end predictor, according to one embodiment.

Referring now to FIG. 2, a chart of connections for a trace end predictor 230 is shown, according to one embodiment. The data read from trace cache array 100 may include micro-ops which are sent to micro-op queue 210, and may also include read data sent on a read data line 234. Trace cache array 100 may be addressed by an address 212 supplied by an address mux 214. Address mux 214 may select from several potential addresses, such as a reset address 226 supplied by a restore machine state 260, feedback addresses 222, 224, and predicted address 220. In turn, predicted address 220 may be supplied by predictor mux 218 from several trace address predictors, such as a return stack buffer 270, generic predictors A 250 and B 240, and predicted tail data 232 from a trace end predictor 230. Read data 234 read from the trace cache array 100 may also be submitted as read data to mux 236, where it may be used as an address. In many cases, the data read from a trace element may include a pointer to the next trace element to be read, along with the address of the current trace element. This pointer may then be presented to predictor mux 218, where it may be selected as predicted address 220.

In one embodiment, during a data read from a trace tail, trace end predictor 230 may store in a buffer both the address of the tail (set number and way number) as well as the next head address (set number and way number) pointed to by the contents of the tail. The access time reading from the buffer may be substantially less than the access time reading from the trace cache array 100. Therefore, on a subsequent execution of that trace, when it is clear that the tail will be executed, the next head address may be retrieved from the buffer as predicted tail data 232 rather than as part of the read data 234. This may permit accessing the head of the next trace one or more pipeline stages earlier.

Figure 3:
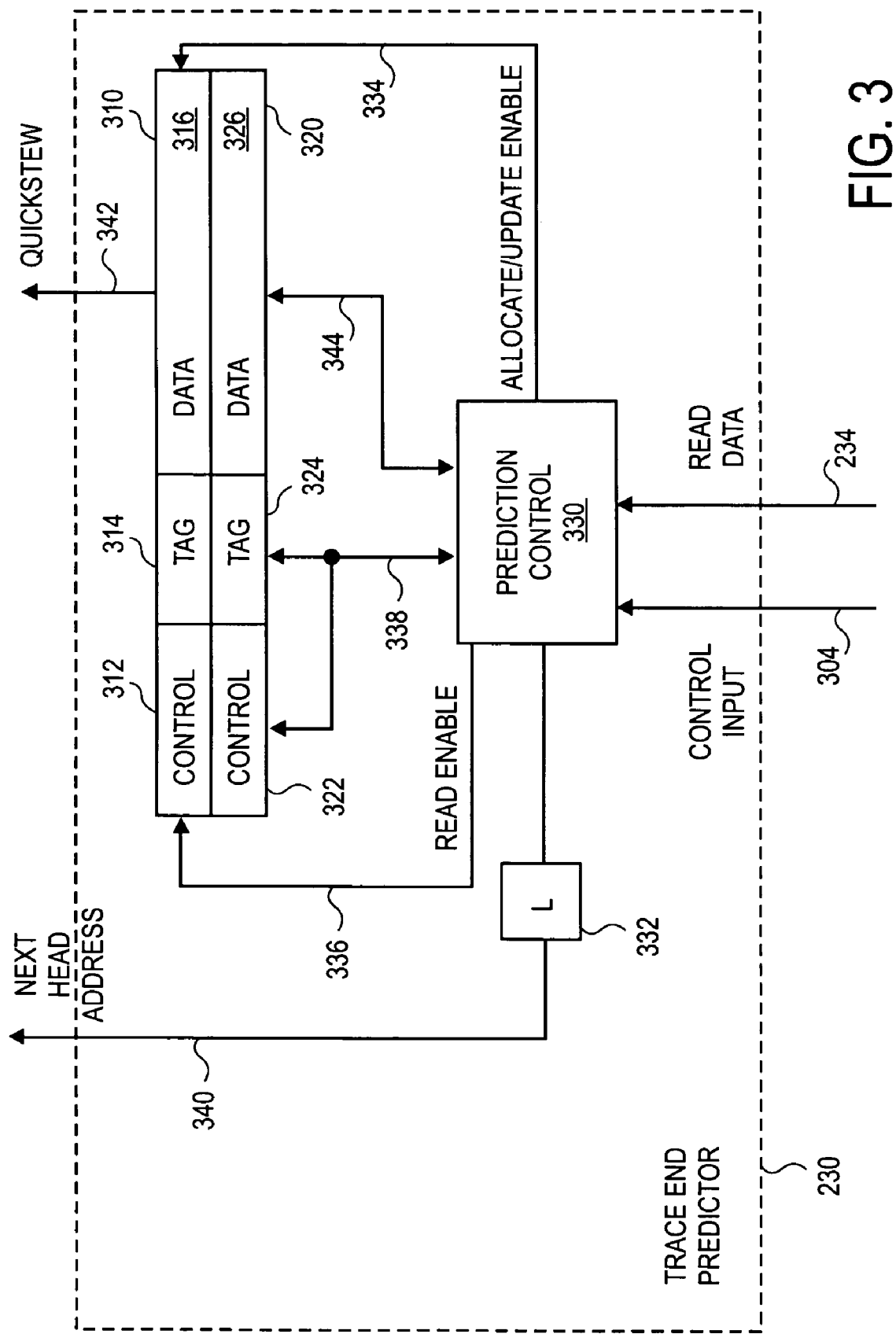
FIG. 3 is a diagram of circuits within a trace end predictor, according to one embodiment of the present disclosure.

Referring now to FIG. 3, a diagram of circuits within a trace end predictor 230 is shown, according to one embodiment of the present disclosure. A pair of buffers 310, 320 is shown in the FIG. 3 embodiment. However, in other embodiments a single buffer may be used, or there may be more than two buffers. Each buffer may contain address information for a trace tail, the next head of a trace pointed to by the tail data, and other control and data. In one embodiment, buffer 310 includes three fields: control 312, tag 314, and data 316. Control 312 may include information concerning how frequently the information within buffer 310 is accessed in order to support data replacement methods such as last-recently-used. Tag 314 may contain the set number and way number of the trace tail whose data is contained in data 316. In data 316 may be stored the next head address of a following trace, as well as certain quickstew information that may be used in a hashing function, called a stew, by other trace predictors.

In one embodiment, when tail data arrives over read data 234, prediction control 330 may examine the contents of buffers 310, 320 to determine whether to update their contents. If the tag 314, 324 of either buffer 310, 320 matches the set number and way number of the current tail, then prediction control 330 may update the corresponding control 312, 324 to indicate recent access. If, however, the tag 314, 324 of neither buffer 310, 320 matches the set number and way number of the current tail, then the prediction control 330 may decide whether to replace the contents of buffer 310 or buffer 320 with the data corresponding to the current tail. Prediction control 330 may make this determination based upon the contents of control 312, 324 and other control inputs 304. The command to replace the contents of a buffer 310, 320 may be carried in an allocate/update enable 334.

When a trace is in execution, and that trace's tail data is in one of the buffers 310, 320 of trace end predictor 230, it is possible to retrieve that tail data from one of the buffers 310, 320 faster than it could be read from trace cache array 100. In one embodiment, a control input 304, comprising information that the address of the trace's tail has been issued as an address 212 to the trace cache array 100, may induce prediction control 330 to cause a read enable 336 signal to cause a read from one of buffers 310, 320. In this case, the tail data may leave trace end predictor 230 over a next head address 340 signal, and, additionally, the corresponding quickstew data may leave trace end predictor 230 over quickstew 342 signal.

In another embodiment, a control input 304, comprising information that the address of a body of the trace, prior to the trace's tail, has been issued as an address 212 to the trace cache array 100, may induce prediction control 330 to cause a read enable 336 signal to cause a read from one of buffers 310, 320. In this embodiment, the tail data, read from one of the buffers 310, 320, may issue as a next head address substantially before the tail of the present thread would be fetched from the trace cache array 100. If the tail of the trace is never reached, due to misprediction or other reasons, the next head address given by the trace end predictor 230 may be erroneous. So this embodiment may permit the earlier fetching of the next head but at the cost of requiring additional complexity in the other trace predictor circuits. For this reason the FIG. 2 predictor mux 218 may give priority to off-trace predictions from predictor A 250 and predictor B 240 over those from trace end predictor 230.

In FIG. 3 the next head address 340 is shown delayed by latch 332 and emerging from prediction control 330. In other embodiments, the next head address could emerge from one of buffers 310, 320 along other signal paths and timing circuits.

Figure 4A:
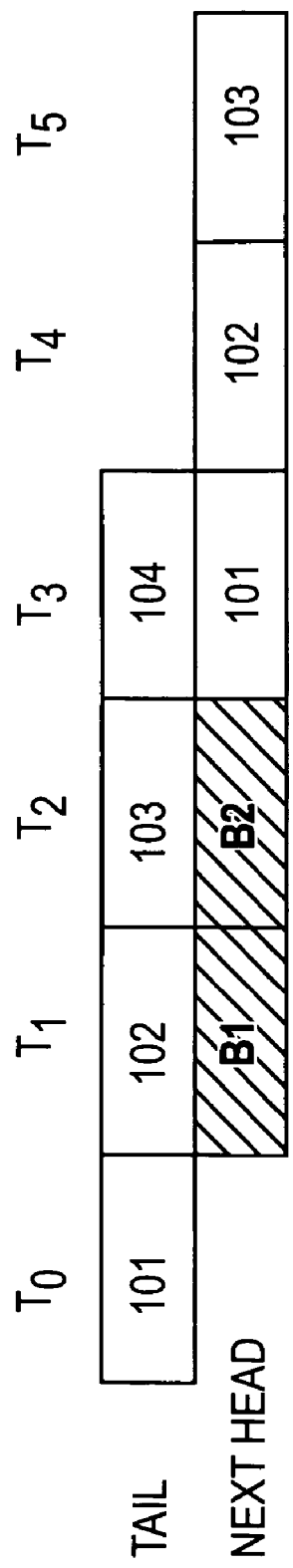
FIGS. 4A and 4B are timing diagrams of trace executions, according to one embodiment of the present disclosure.
Figure 4B:
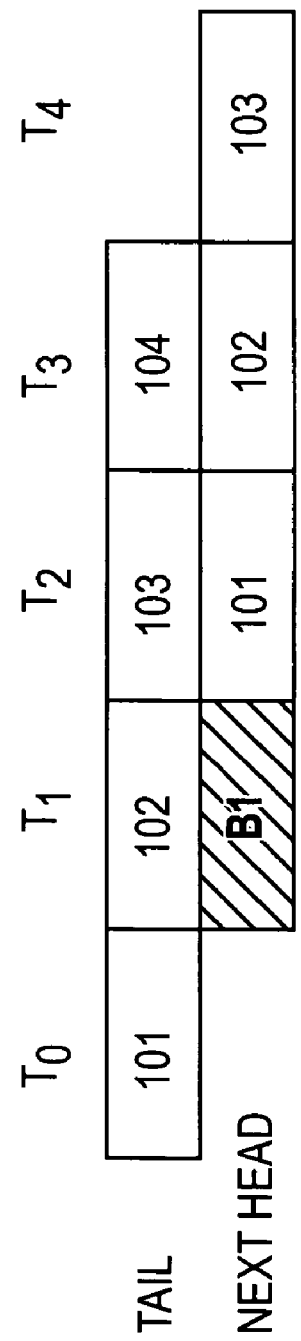

Referring now to FIGS. 4A and 4B, the timing diagrams of trace executions are shown, according to one embodiment of the present disclosure. FIG. 4A presupposes that the trace end predictor 230 is not used and that the next head address is determined by reading the tail data from the trace cache array 100. At time T0 the tail micro-op is in pipeline stage 101. It would be advantageous if the next head micro-op could enter pipeline stage 101 at time T1, but instead several stall cycles or "bubbles" B1 and B2 show the delay caused by retrieving the next head address from the trace cache array 100 until the next head micro-op enters pipeline stage 101 at time T3.

FIG. 4B shows how at least one bubble may be avoided by the early retrieval of the next head address by using the trace end predictor 230. Rather than waiting until the next head address is read from trace cache array 100, the next head address, stored in the trace end predictor 230, may be retrieved at the time of the presenting of the address of the tail to the trace cache array 100. The permits accessing the micro-op of the next head and placing it into pipeline stage 101 at time t2, one time period earlier than in the FIG. 4A embodiment. Only one bubble B1 may be necessary here. Because the system has waited until the tail was in fact fetched, occasions of misprediction may be reduced. It may be possible to retrieve the next head address from trace end predictor 230 during a body of the trace prior to the tail, but as mentioned above this may require additional care in predicting off-trace execution.

Figure 5:
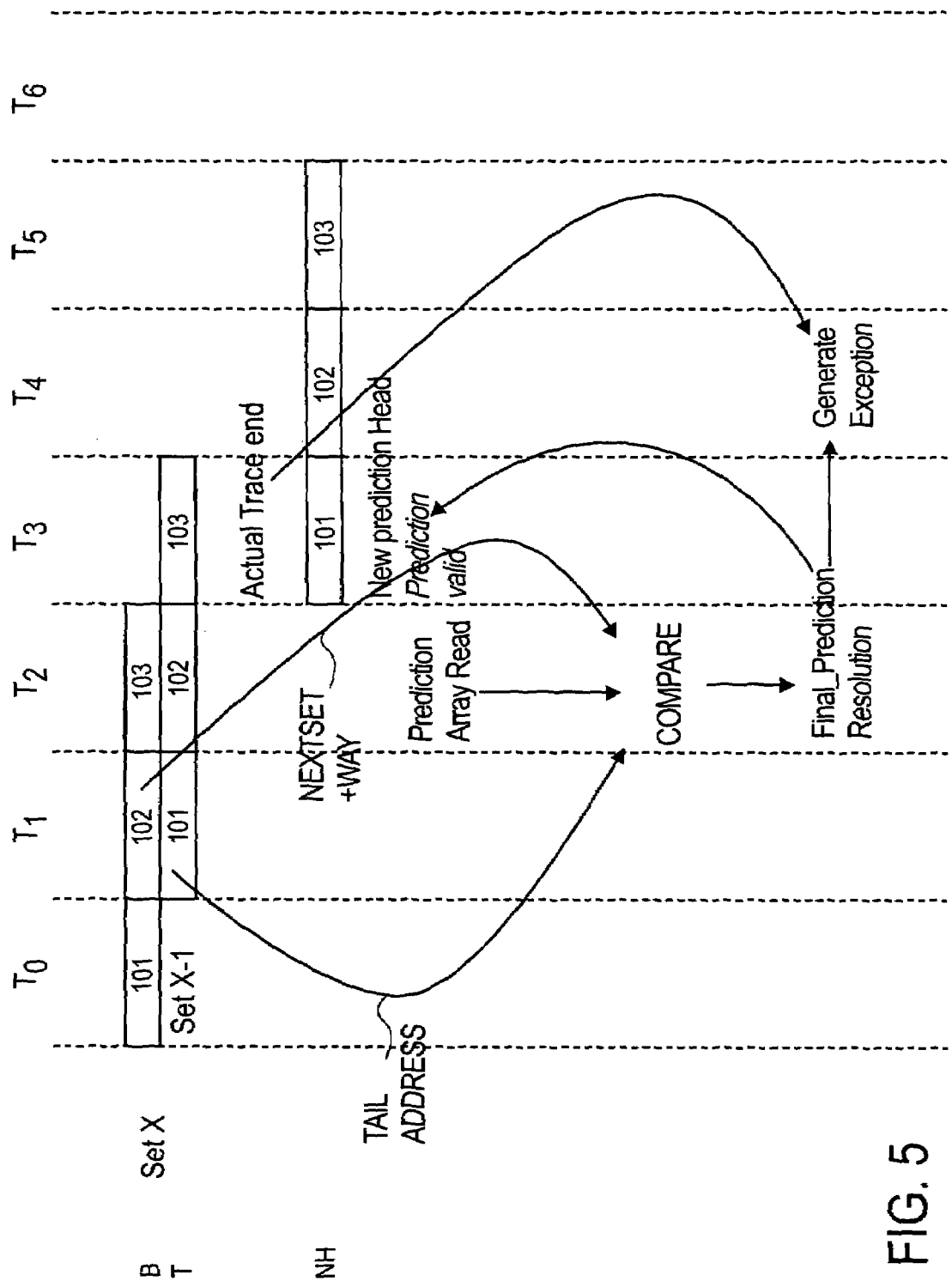
FIG. 5 is a timing diagram of trace executions, according to one embodiment of the present disclosure.

Referring now to FIG. 5, a timing diagram of trace executions is shown, according to one embodiment of the present disclosure. The process shown in FIG. 5 may be used to enhance and validate data used to support detection of misprediction and other errors. At time T0 the micro-op of the last body of a trace enters the pipeline at stage 101, and at time T1 that micro-op enters pipeline stage 102 while the micro-op of the tail enters stage 101. During time T1, the next set and way information of body whose micro-op is at stage 102 and the tail address whose micro-op is at stage 101 may be compared, at time T2, with the selected tag and data read from the selected buffer 310, 320 of the trace end predictor 230. If the comparison is positive, then a final prediction resolution signal may be used to validate the prediction with the new prediction head data. If, however, the comparison is not positive, then this negative result, combined with the reaching of the tail micro-op at pipeline stage 103 and the resulting actual trace end results, may be used to initiate the generation of an exception that may flush the pipeline and engage an exception handler.

Figure 6A:
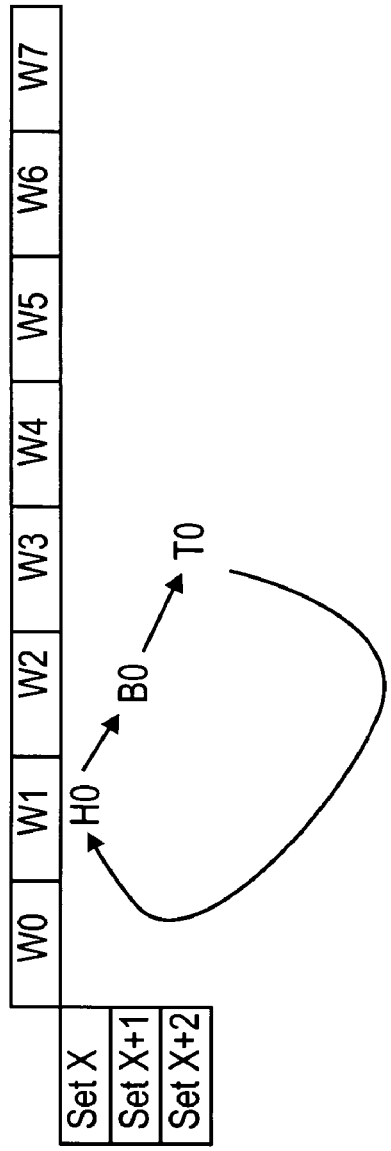
FIGS. 6A and 6B are an array and timing diagram showing trace executions in a loop, according to one embodiment of the present disclosure.
Figure 6B:
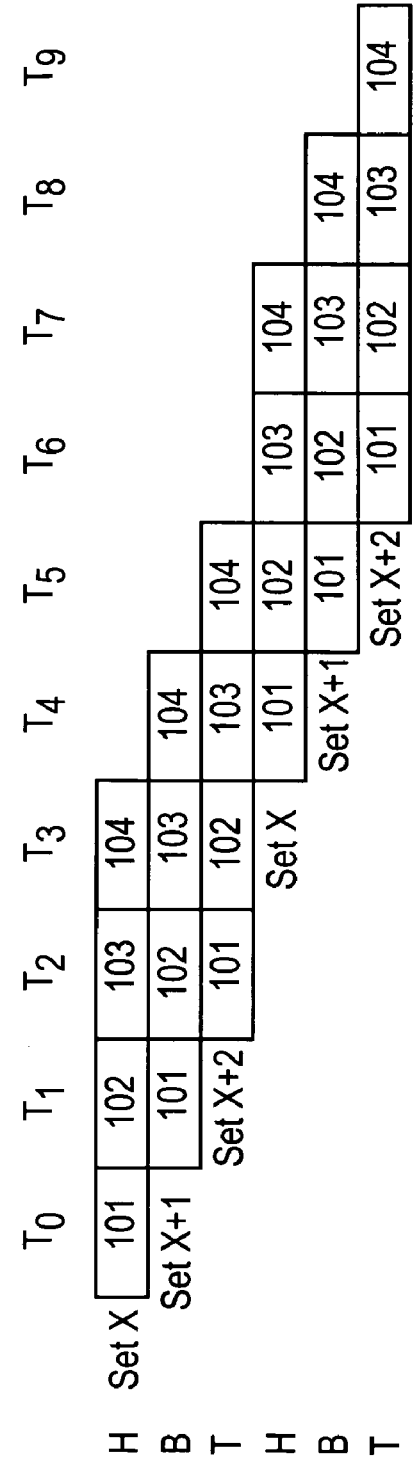

Referring now to FIGS. 6A and 6B, an array and timing diagram showing trace executions in a loop are shown, according to one embodiment of the present disclosure. FIG. 6A shows the execution of a tight loop comprising a single trace (shown within a portion of the sets and ways of a trace cache array), with head H0, body B0, and tail T0. In this case the next head address is the address H0 of the trace in question.

FIG. 6B shows the execution of this trace when supported by a trace end predictor 230. In a previous cycle, the tail data may be presumed to have been stored into one of the buffers 310, 320 of a trace end predictor 230. At time T0, the head H0 enters pipeline stage 101; at time T1, the body B0 enters pipeline stage 101; and at time T2 the tail T0 enters pipeline stage 101. During this execution there have been no stall cycles or "bubbles" required, and the pipeline has been kept full with micro-ops for execution.

At time T3 a bubble may be inserted, as shown in the embodiment of FIG. 4B. But as the tail data is read from trace end predictor 230, the next head H0 may be accessed in time for H0 to enter pipeline stage 101 during time T4. Then B0 may enter pipeline stage 101 during time T5 and the tail T0 may enter pipeline stage 101 during time T6. Notice that in this example there are three clock cycles with utilized pipeline stages for every four clock cycles. In this manner, repeated loops of one or a small number of traces may utilize the trace end predictor 230 even with a small number of buffers, such as the two buffers 310, 320 shown in FIG. 3.

Figure 7:
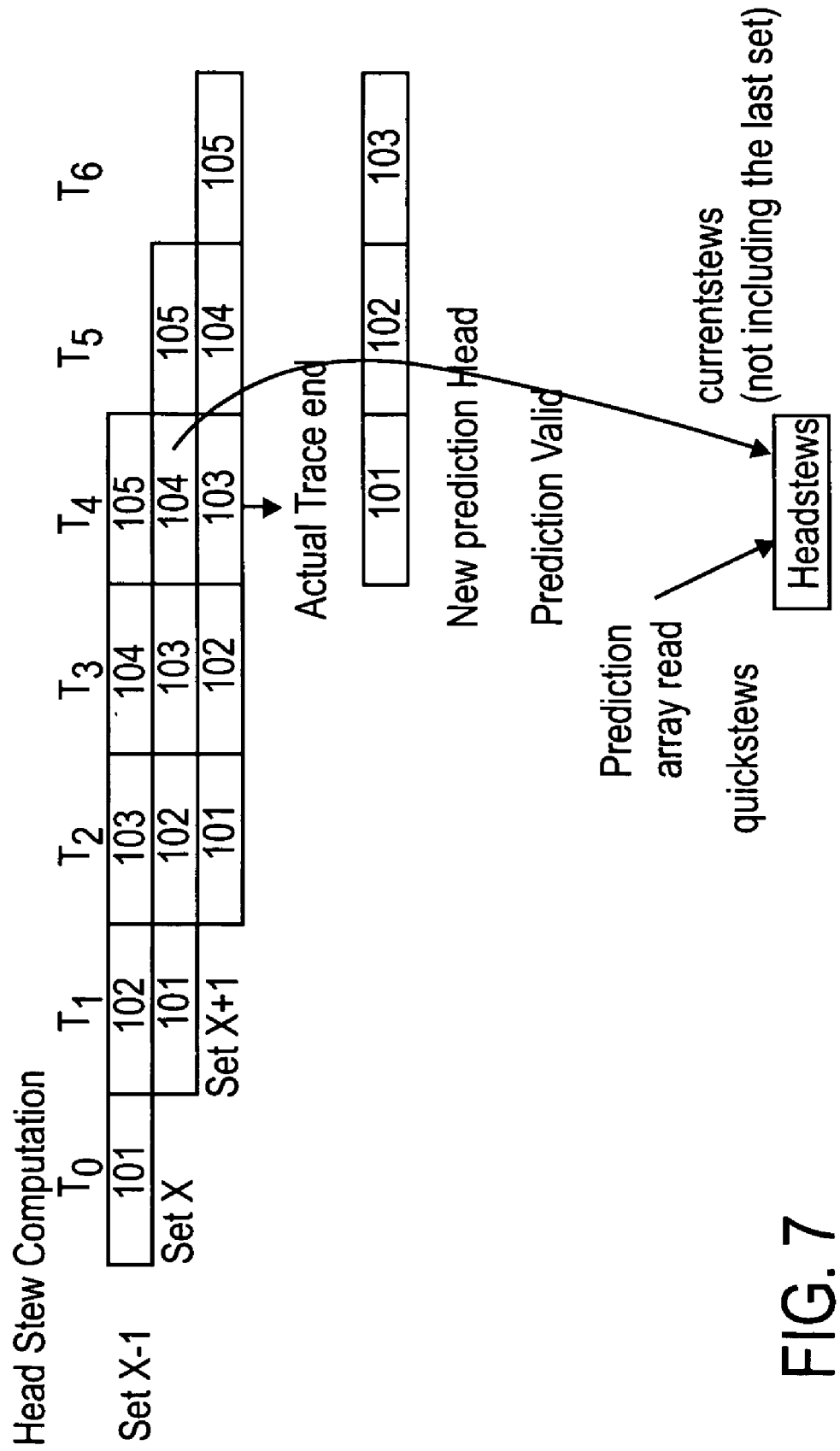
FIG. 7 is a timing diagram showing computation of a headstew for a subsequent trace, according to one embodiment of the present disclosure.

Referring now to FIG. 7, a timing diagram showing computation of a headstew for a subsequent trace is shown, according to one embodiment of the present disclosure. A running stew may be tallied in order to support trace execution predictions in a generic predictor, such as the predictors A and B 250, 240 of FIG. 2. In some embodiments, the stew may be some cumulative hashing function of the addresses of trace elements as they execute. The expression "headstew" may refer to the value of the stew when the head of a trace is accessed. However, when utilizing the trace end predictor 230 the next head may be accessed, and its execution begun, at an earlier time than when accessing the next head by reading the trace cache array. For this reason, the headstew calculated the normal way may be incorrect for use in prediction. In one embodiment, a partial stew calculation for the last body of a trace with the tail, which may be called a "quickstew", may be stored in the buffers 310, 320 of a trace end predictor 230 along with the address of the next head. In this manner the headstew may be calculated one or more clock cycles early.

In FIG. 7, when the tail of one trace is loaded into pipeline stage 101 at time 3, the next head address and corresponding quickstew may be read from the trace end predictor 230 during time T3. This may be combined with the current stew value, made available at time T4, to form a predicted value of the headstew for the new trace at time T4. This predicted value of the headstew may then be used to support further trace execution prediction when the next head enters pipeline stage 101 at time T4.

Figure 8:
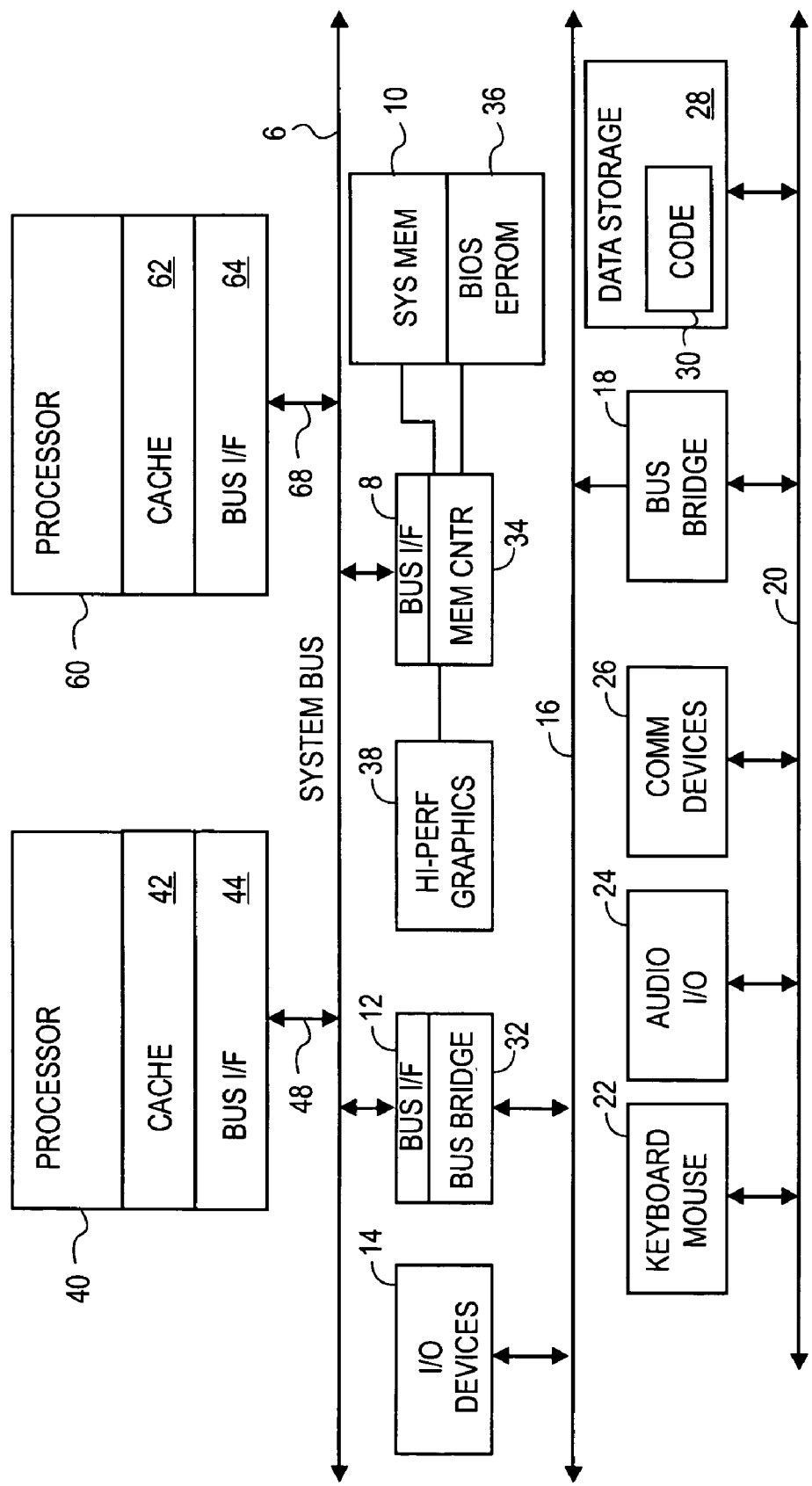
FIG. 8 is a schematic diagram of a processor system, according to one embodiment of the present disclosure.

Referring now to FIG. 8, a schematic diagram of a processor system is shown, according to one embodiment of the present disclosure. The FIG. 8 system may include several processors of which only two, processors 40, 60 are shown for clarity. Processors 40, 60 may include the trace cache array 100 and trace end predictor 230 of FIG. 2. The FIG. 8 multiprocessor system may have several functions connected via bus interfaces 44, 64, 12, 8 with a system bus 6. In one embodiment, system bus 6 may be the front side bus (FSB) utilized with Pentium 4® class microprocessors manufactured by Intel® Corporation. A general name for a function connected via a bus interface with a system bus is an "agent". Examples of agents are processors 40, 60, bus bridge 32, and memory controller 34. In some embodiments memory controller 34 and bus bridge 32 may collectively be referred to as a chipset. In some embodiments, functions of a chipset may be divided among physical chips differently than as shown in the FIG. 8 embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface, or an AGP interface operating at multiple speeds such as 4×AGP or 8×AGP. Memory controller 34 may direct read data from system memory 10 to the high-performance graphics circuit 38 across high-performance graphics interface 39.

Bus bridge 32 may permit data exchanges between system bus 6 and bus 16, which may in some embodiments be a industry standard architecture (ISA) bus or a peripheral component interconnect (PCI) bus. There may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
    a trace cache array to store a first trace and a second trace; and
    a trace-end predictor to store a first tail data from said first trace to predict an address for said second trace.

2. The apparatus of claim 1, wherein said first tail data includes a set and a way for a head of said second trace.

3. The apparatus of claim 1, wherein said first tail data includes a quickstew.

4. The apparatus of claim 1, wherein said trace end predictor is to read said first tail data when a tail of said first trace is accessed.

5. The apparatus of claim 1, wherein said trace end predictor is to read said first tail data when a body before a tail of said first trace is accessed.

6. The apparatus of claim 1, further comprising a selector to select said address from said trace-end predictor and another predictor.

7. The apparatus of claim 6, wherein said selector is to give priority to said another predictor.

8. The apparatus of claim 1, wherein said trace-end predictor is to store a third tail data from a third trace to predict an address for a fourth trace.

9. The apparatus of claim 8, wherein said trace-end predictor is to store tag data of said first trace and said third trace to determine which trace is currently in execution.

10. A method, comprising:
    storing tail data of a first trace during a first execution of said first trace;
    retrieving said tail data during a second execution of said first trace; and
    fetching a head of a second trace from a trace cache using said tail data.

11. The method of claim 10, wherein said storing includes storing set and way information of said first trace.

12. The method of claim 10, wherein said storing includes storing set and way information of said head.

13. The method of claim 10, wherein said storing includes storing a quickstew.

14. The method of claim 13, further comprising calculating a headstew for said second trace using said quickstew.

15. The method of claim 10, wherein said retrieving is performed subsequent to initiating access to a tail of said first trace during said second execution.

16. The method of claim 10, wherein said retrieving is performed subsequent to initiating access to a body of said first trace prior to a tail of said first trace during the second execution.

17. The method of claim 10, further comprising inhibiting said fetching when an off-trace prediction is made.

18. An apparatus, comprising:
    means for storing tail data of a first trace during a first execution of said first trace;
    means for retrieving said tail data during a second execution of said first trace; and
    means for fetching a head of a second trace from a trace cache using said tail data.

19. The apparatus of claim 18, wherein said means for storing includes means for storing set and way information of said first trace.

20. The apparatus of claim 18, wherein said means for storing includes means for storing set and way information of said head.

21. The apparatus of claim 18, wherein said means for storing includes means for storing a quickstew.

22. The apparatus of claim 21, further comprising means for calculating a headstew for said second trace using said quickstew.

23. A system, comprising:
    a processor including a trace cache array to store a first trace and a second trace, and a trace-end predictor to store a first tail data from said first trace to predict an address for said second trace;
    a memory coupled to said processor to store instructions to be decoded to supply said trace cache array; and
    an audio input/output device coupled to said memory and to said processor.

24. The system of claim 23, wherein said first tail data includes a set and a way for a head of said second trace.

25. The system of claim 23, wherein said first tail data includes a quickstew.

26. The system of claim 23, wherein said trace end predictor is to read said first tail data when a tail of said first trace is accessed.

27. The system of claim 23, wherein said trace end predictor is to read said first tail data when a first body before a first tail of said first trace is accessed.

* * * * *